(12) United States Patent
Blaney et al.

(10) Patent No.: US 9,879,551 B2
(45) Date of Patent: Jan. 30, 2018

(54) FLUID DAMPER AND METHOD OF MAKING

(71) Applicant: United Technologies Corporation, Hartford, CT (US)

(72) Inventors: Ken F. Blaney, Middleton, NH (US); Richard K. Hayford, Cape Neddick, ME (US)

(73) Assignee: United Technologies Corporation, Farmington, CT (US)

( * ) Notice: Subject to any disclaimer, the term of this patent is extended or adjusted under 35 U.S.C. 154(b) by 314 days.

(21) Appl. No.: 14/698,284

(22) Filed: Apr. 28, 2015

(65) Prior Publication Data

US 2015/0361801 A1 Dec. 17, 2015

Related U.S. Application Data

(60) Provisional application No. 62/001,850, filed on May 22, 2014.

(51) Int. Cl.
| | |
|---|---|
| *F01D 5/16* | (2006.01) |
| *F01D 5/26* | (2006.01) |
| *F01D 5/18* | (2006.01) |
| *F01D 25/06* | (2006.01) |

(52) U.S. Cl.
CPC ............... *F01D 5/26* (2013.01); *F01D 5/16* (2013.01); *F01D 5/18* (2013.01); *F01D 25/06* (2013.01); *F05D 2220/32* (2013.01); *F05D 2230/211* (2013.01); *F05D 2260/96* (2013.01); *F05D 2300/1606* (2013.01); *F05D 2300/1614* (2013.01); *Y10T 29/49341* (2015.01)

(58) Field of Classification Search
None
See application file for complete search history.

(56) References Cited

U.S. PATENT DOCUMENTS

| | | | | |
|---|---|---|---|---|
| 2,349,187 | A * | 5/1944 | Meyer | F01D 5/16 188/322.5 |
| 4,460,314 | A * | 7/1984 | Fuller | F01D 5/26 416/145 |
| 6,155,789 | A * | 12/2000 | Mannava | C21D 10/005 29/889.1 |
| 6,565,312 | B1 * | 5/2003 | Horn | F01D 5/147 415/114 |
| 6,626,642 | B1 * | 9/2003 | Veldkamp | F16F 7/10 416/79 |
| 2003/0156942 | A1 * | 8/2003 | Villhard | F01D 5/16 416/96 R |
| 2011/0070085 | A1 * | 3/2011 | El-Aini | F01D 5/16 416/145 |

(Continued)

*Primary Examiner* — Woody Lee, Jr.
*Assistant Examiner* — Theodore Ribadeneyra
(74) *Attorney, Agent, or Firm* — Kinney & Lange, P.A.

(57) ABSTRACT

An airfoil includes an airfoil structure defining a damping network that includes a first cavity, a second cavity, a flow passage connecting the first and second cavities. The airfoil further includes a damping material configured to flow through the damping network. A method of forming an airfoil includes forming an airfoil body having a damping network that includes a first cavity, a second cavity, and a flow passage connecting the first and second cavities. The method further includes adding a damping material configured to flow through the damping network.

12 Claims, 6 Drawing Sheets

(56) References Cited

U.S. PATENT DOCUMENTS

2013/0058785 A1* 3/2013 Kellerer .................... F01D 5/16
  416/1
2013/0280093 A1* 10/2013 Zelesky .................... B22C 9/10
  416/97 R

* cited by examiner

FLUID DAMPER AND METHOD OF MAKING

CROSS-REFERENCE TO RELATED APPLICATION(S)

This application claims the benefit of U.S. Provisional Application No. 62/001,850, filed May 22, 2014 for "FLUID DAMPER AND METHOD OF MAKING".

BACKGROUND

Vanes, blades and other components of gas turbine engine compressors and low pressure turbines oscillate or vibrate during operation. In order to prevent damage to these components and nearby structures during operation, damping features are used to reduce the magnitude of the component oscillations or vibrations. Many components use spring dampers, leaf spring dampers or other physical dampers to reduce the vibration of the component. These dampers are subject to wear and have limited effective lifetimes after which damping performance can be significantly reduced or eliminated. Because these dampers contain multiple parts they can also malfunction resulting in reduced damping performance.

SUMMARY

An airfoil includes an airfoil structure defining a damping network that includes a first cavity, a second cavity, and a flow passage connecting the first and second cavities. The airfoil further includes a damping material configured to flow through the damping network.

A method of forming an airfoil includes forming an airfoil body having a damping network that includes a first cavity, a second cavity, and a flow passage connecting the first and second cavities. The method further includes adding a damping material configured to flow through the damping network.

DETAILED DESCRIPTION

The present disclosure describes a component having a damping network. The damping network includes first and second internal cavities connected by a flow passage and a damping material that is configured to flow through the damping network to reduce oscillations and vibrations within the component during operation. The described damping network provides damping to the component without some of the disadvantages of physical dampers and provides additional manufacturing flexibility.

Figure 1:
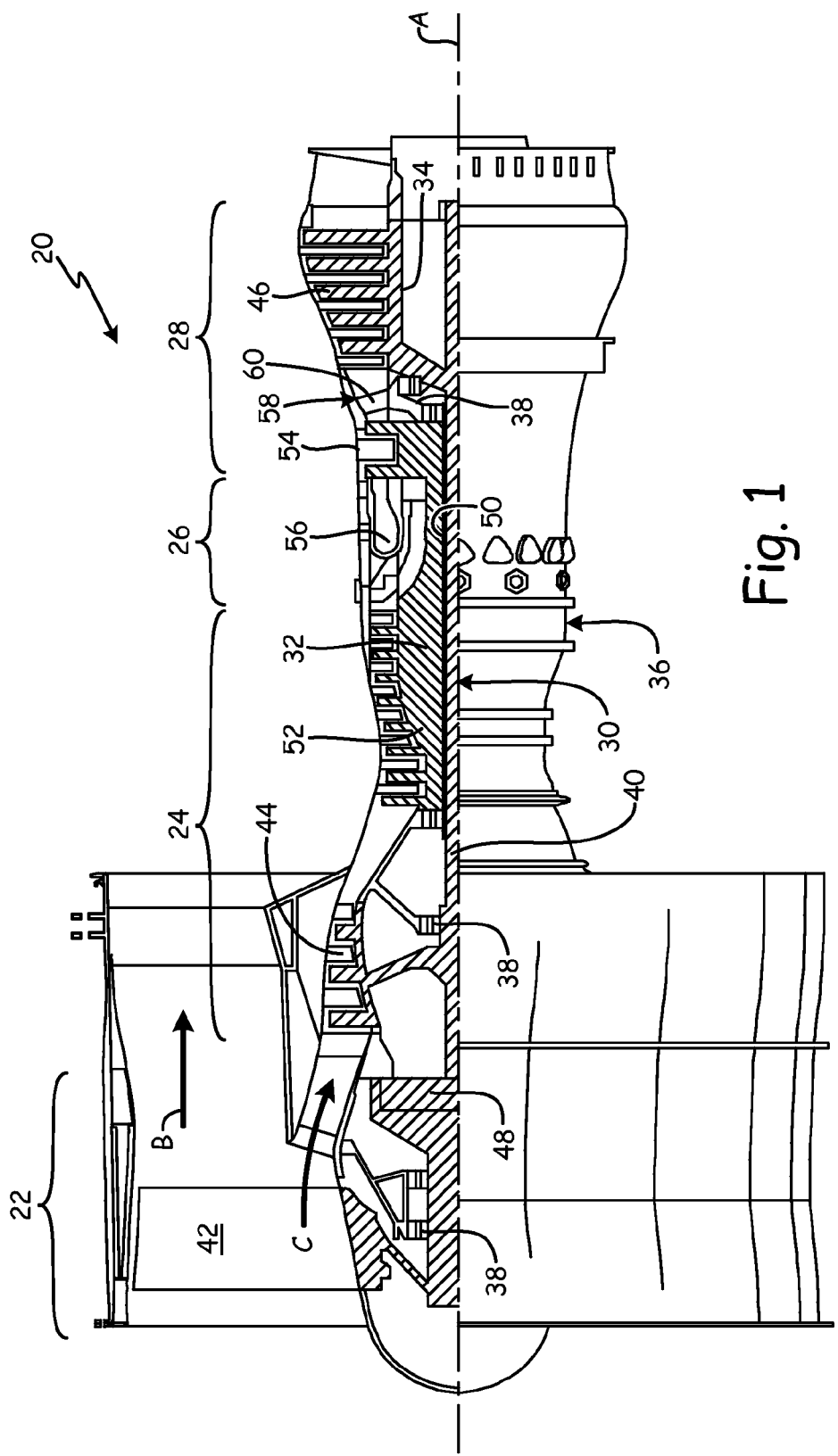
FIG. 1 is a view of a gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines, such as, for example, a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ ^\circ R)/518.7)^{0.5}]$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades in fan section 22 disclose an example gas turbine engine 20 with increased power transfer efficiency.

When gas turbine engine 20 is operating, an airfoil present in fan section 22, compressor section 24 or low pressure turbine 46 will tend to vibrate at one or more of its natural frequencies due to mechanical excitation from minor imbalance or whirl of the rotating parts or aero-elastic excitation from unsteady or periodic pressure fluctuations in the flow from adjacent stationary airfoils (if damped airfoils are attached to the rotor), from adjacent rotating airfoils (if damped airfoils are stationary), or from other sources. A combination of mechanical and aero-elastic excitations can also cause airfoil vibrations.

According to the present disclosure, an airfoil design enhances the relative motion between the airfoil suction and pressure sides by tailoring the size and extent of the shapes of its internal cavities and passages, which separate the suction and pressure sides for specific or multiple vibration mode (deflected) shapes that are associated with each natural frequency. The relative motion between the sides will do work on an internal (damping) fluid by pushing or compressing it through restrictions in the internal cavities and passages. The shapes of the internal cavities and passages deliberately include variations in the gap or distance between the two sides that would constrict the damping fluid flow. The damping fluid will tend to absorb energy from the airfoil by generating heat from friction when passing through the reduced or constricted gaps, thereby providing damping. This in turn reduces the vibrational displacement and dynamic stress levels of the airfoils.

Figure 2:
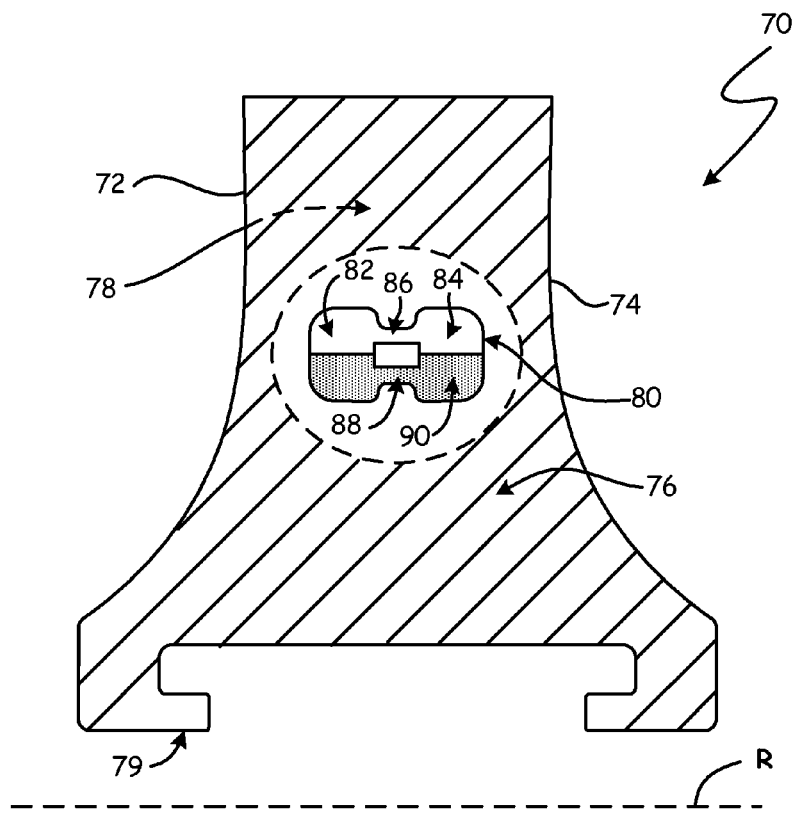
FIG. 2 is a view of an airfoil having two damping cavities connected by two flow passages.

FIG. 2 illustrates an airfoil having a damping network according to one embodiment of the present disclosure. Airfoil 70 includes leading edge 72 and trailing edge 74. Pressure side wall 76 extends from leading edge 72 to trailing edge 74 on one side of airfoil 70. Suction side wall 78 extends from leading edge 72 to trailing edge 74 on the opposite side of airfoil 70. In some embodiments, airfoil 70 belongs to a vane or a blade in a gas turbine engine compressor or low pressure turbine. In embodiments where airfoil 70 is a vane, attachment feature 79 is used to retain airfoil 70 adjacent a stationary case or other structure. Attachment feature 79 can have different shapes or configurations than what is shown in FIG. 2 depending on the application. In embodiments where airfoil 70 is a blade (not shown), attachment feature 79 (i.e. blade root, etc.) is used to retain airfoil 70 adjacent a rotor. Airfoil 70 is substantially solid, and can be constructed from a number of materials by additive manufacturing or investment casting. Suitable materials for airfoil 70 include aluminum, steel, nickel, titanium, chromium, alloys thereof and combinations thereof. A method of manufacturing airfoil 70 is described in greater detail below.

A portion of pressure side wall 76 of airfoil 70 is shown cut away to illustrate damping network 80. As shown in FIG. 2, damping network 80 includes first cavity 82, second cavity 84, flow passage 86, flow passage 88 and damping material 90. The elements of damping network 80 are formed between and defined and contained by pressure side wall 76 and suction side wall 78. Damping network 80 is sealed relative to the outside of airfoil 70; materials present within damping network 80 do not directly interact with fluids passing the outer surfaces of airfoil 70 and vice versa.

As shown in FIG. 2, first cavity 82 and second cavity 84 are spaces formed within the body of airfoil 70. First cavity 82 and second cavity 84 are spaced from one another to form two distinct cavities. In some embodiments, such as the one shown in FIG. 2, first cavity 82 and second cavity 84 are generally cylindrical in shape. In other embodiments, first cavity 82 and second cavity 84 are generally spherical, generally rectangular or possess irregular shapes with intricate geometry. The shape of first cavity 82 and second cavity 84 can be modified to provide optimal damping levels to airfoil 70.

Flow passage 86 is a passage within the body of airfoil 70 that connects and fluidly couples first cavity 82 to second cavity 84. In one embodiment, a single flow passage 86 connects first cavity 82 to second cavity 84. In other embodiments, such as the one shown in FIG. 2, multiple flow passages (flow passages 86 and 88) separately connect first cavity 82 to second cavity 84. A suitable number of flow passages 86, 88 is generally between one and ten for most airfoils 70. The presence of too many flow passages 86, 88 can reduce the structural integrity of airfoil 70. Fluid present in damping network 80 is able to pass from first cavity 82 to second cavity 84 through flow passages 86 and 88 and vice versa.

Continuing with FIG. 2, a damping material 90 is provided in damping network 80. Damping material 90 is a substance that is generally a fluid at the operating temperature of airfoil 70 where damping is needed to reduce vibratory effects. In some embodiments, damping material 90 is a low-melt alloy. The low-melt alloy melts at a much lower temperature than the material of which airfoil 70 is constructed. The low-melt alloy generally melts and enters the liquid phase at temperatures below the operating temperature of airfoil 70. For example, some gas turbine engine compressors and low pressure turbines are operated at a temperature of about 650° C. (1200° F.). Suitable low-melt alloys used as damping material 90 in these applications have a melting temperature between about 315° C. (600° F.) and about 625° C. (1157° F.). Once the compressor or low pressure turbine reaches its operating temperature and airfoil 70 is in need of damping, damping material 90 has melted and is able to flow through damping network 80. Suitable low-melt alloys include alloys of bismuth, tin, lead and combinations thereof. Particular examples of these alloys include Indalloy #281 (58% Bi, 42% Sn, 138° C. melting temperature) and Indalloy #281-338 (40% Bi, 60% Sn, 138-170° C. melting temperature) available from Indium Corporation (Clinton, N.Y.).

During operation, airfoil 70 is subject to stresses due to airflow and/or rotation (in the case of blades). These stresses cause portions of airfoil 70 to expand, contract, twist or otherwise move. This movement can cause airfoil 70 to oscillate or vibrate. At the same time, this movement also causes fluid damping material 90 to move within damping network 80. Work is performed on damping material 90 as it moves through damping network 80, dissipating some of the oscillatory and vibratory energy, thereby damping oscillations and vibrations. Damping material 90 is able to flow between first cavity 82 and second cavity 84 through flow passages 86 and 88. As damping material 90 flows through damping network 80, the fluid damping material 90 absorbs some of the oscillatory and/or vibrational forces, thus reducing the magnitude of the oscillations and vibrations experienced by airfoil 70.

Figure 3:
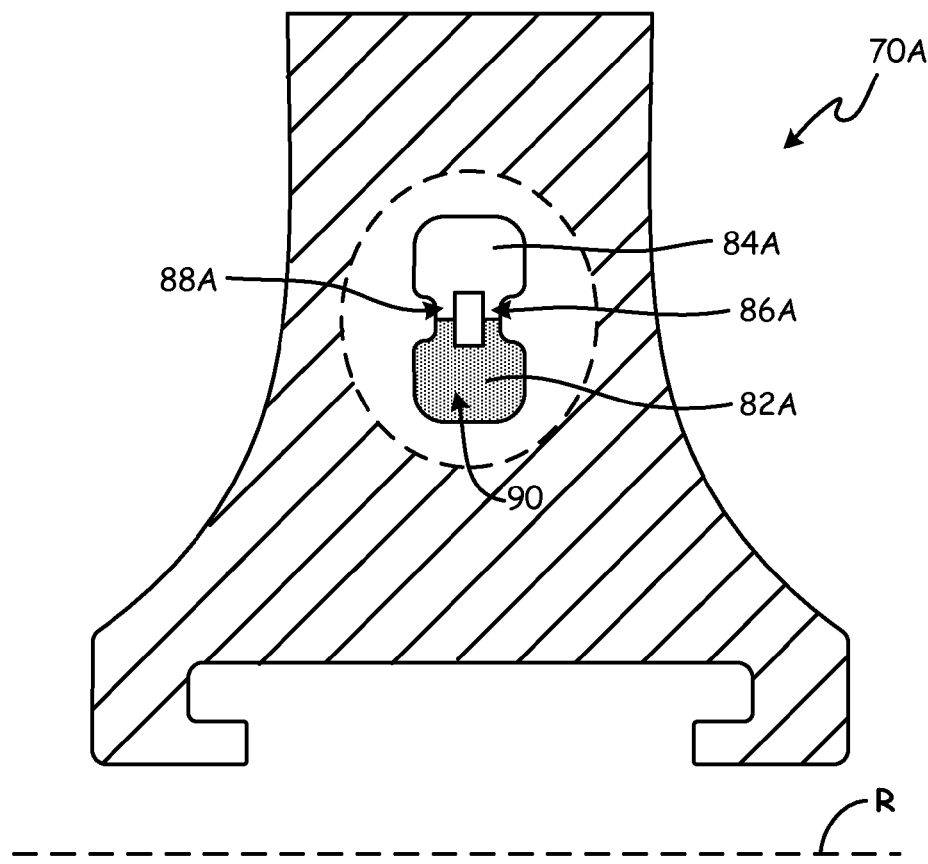
FIG. 3 is a view of another airfoil having two damping cavities connected by two flow passages.

The amount of damping needed for airfoil 70 depends on its structure and use (i.e. compressor, turbine, etc.). The damping capability of damping network 80 can be tuned to the particular needs of airfoil 70 by adjusting the shapes and volumes of first cavity 82 and second cavity 84, the shapes and volumes of flow passages 86 and 88, and the type and amount of damping material 90. For example, FIG. 2 illustrates an embodiment of airfoil 70 in which flow passages 86 and 88 are generally parallel to axis of rotation R (the axis about which one or more stages of blades rotates). That is, flow passages 86 and 88 extend in the axial direction. FIG. 3 illustrates airfoil 70A having two damping cavities 82A and 84A and two radial passages 86A and 88A connecting the two cavities 82A and 84A. In FIG. 3, flow passages 86A and 88A are generally perpendicular to axis of rotation R.

Figure 4:
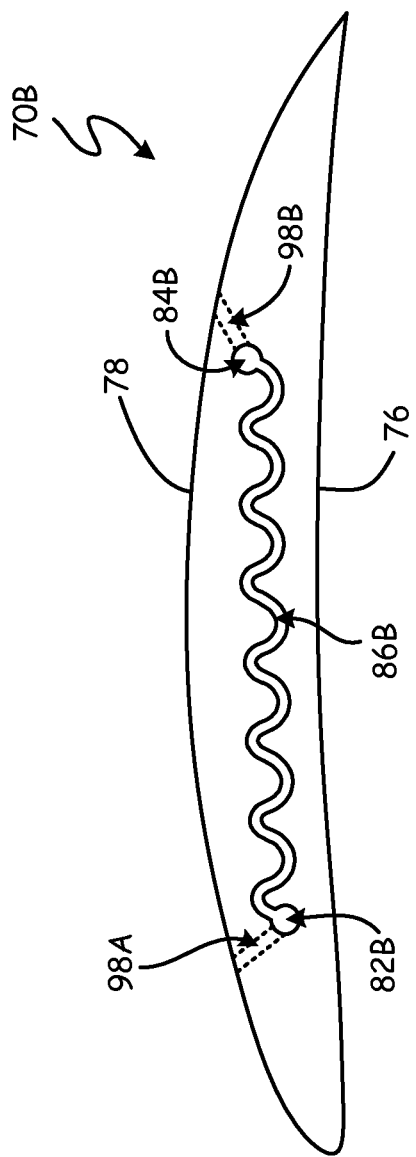
FIG. 4 is a cross section view of an airfoil having two cavities connected by a flow passage.

In other embodiments, more complicated designs of cavities and flow passages are used. FIG. 4 illustrates airfoil 70B having two cavities and a waveform-like passage extending between the cavities. First cavity 82B is located near one end of airfoil 70B and second cavity 84B is located near the opposite end. A single flow passage 86B extends between first cavity 82B and second cavity 84B and connects them. Flow passage 86B has a wavy configuration, undulating between pressure side wall 76 and suction side wall 78. As shown in FIG. 4, flow passage 86B extends from first cavity 82B towards suction side wall 78, curves away from suction side wall 78, extends towards pressure side wall 76, curves away from pressure side wall 76 and extends back towards suction side wall 78. This S-like pattern is repeated until flow passage 86B reaches second cavity 84B. The distances from flow passage 86B to pressure side wall 76 and suction side wall 78 vary along the length of flow passage 86B. Similar to the embodiment shown in FIG. 2, when airfoil 70B vibrates during certain engine conditions, relative motion of pressure side wall 76 and suction side wall 78 does work on damping material (not shown in FIG. 4) present within flow passage 86B, dissipating energy to provide damping.

Figure 5:
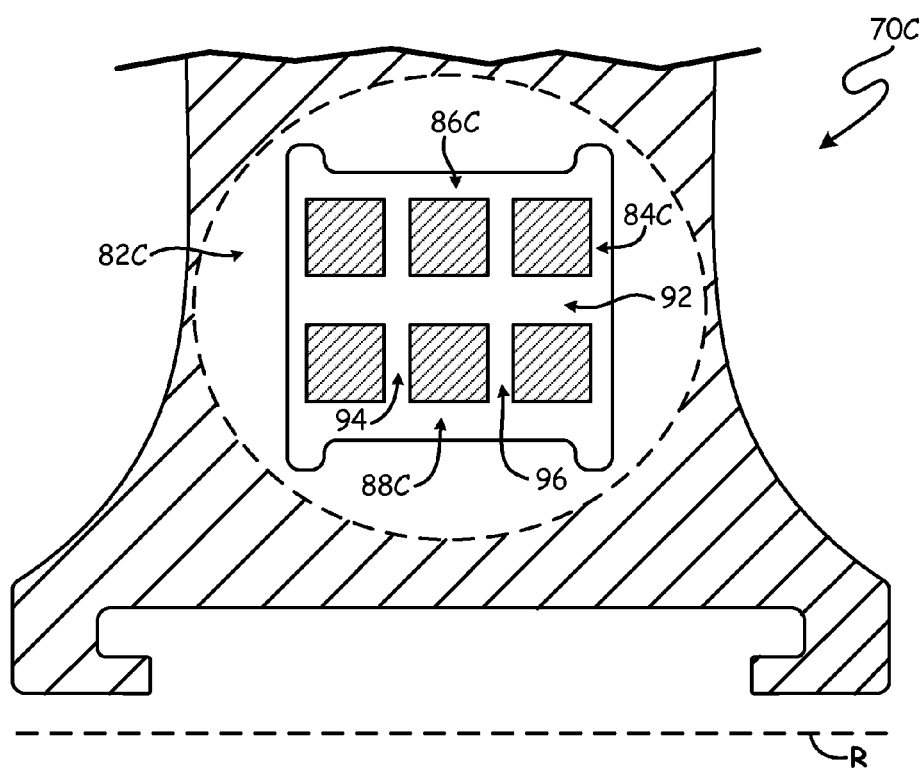
FIG. 5 is a cross section view of an airfoil having two cavities and a flow passage network.
Figure 6:
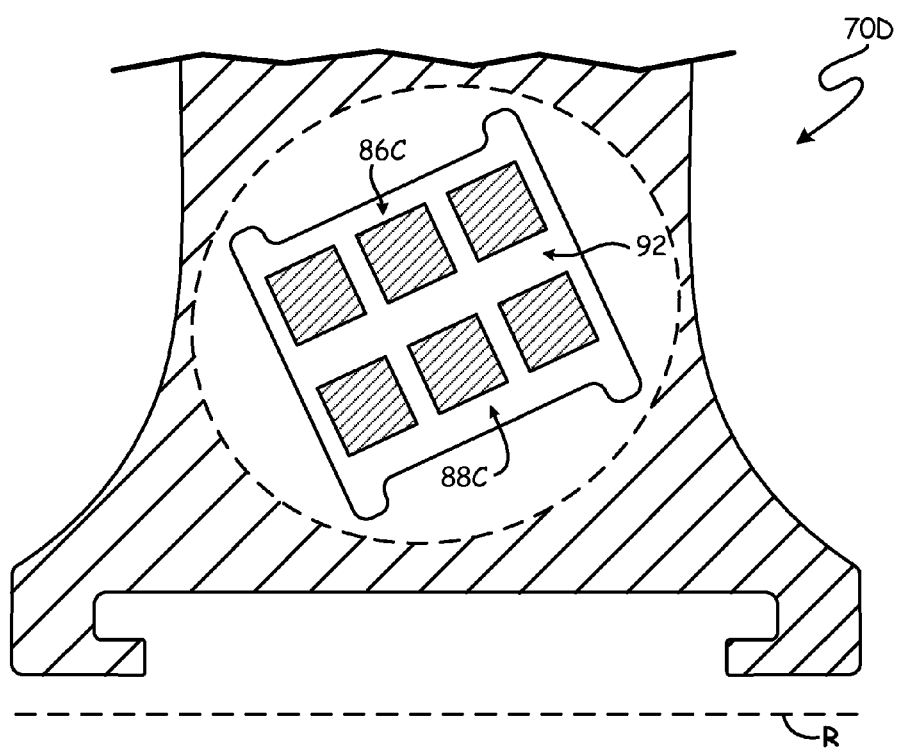
FIG. 6 is a cross section view of another airfoil having two cavities and a flow passage network.

In other embodiments, flow passages between cavities are connected to form a flow passage network resembling a waffle iron-like pattern. FIG. 5 illustrates airfoil 70C having two cavities and a flow passage network. As shown in FIG. 5, first cavity 82C and second cavity 84C are connected by flow passages 86C, 88C and 92. Flow passages 86C, 88C and 92 are also interconnected by flow passages 94 and 96. Flow passages 94 and 96 are generally perpendicular to flow passages 86C, 88C and 92. Flow passages 86C, 88C and 92 are generally parallel to axis of rotation R. FIG. 6 illustrates an embodiment similar to that of FIG. 5, except that flow passages 86C, 88C and 92 are positioned within airfoil 70D at an angle acute to axis of rotation R. The embodiments shown in FIG. 5 and FIG. 6 offer different damping capabilities when compared to the embodiments of FIGS. 2-4. In still other embodiments, airfoil 70 can include multiple damping networks 80. In these embodiments, one damping network 80 can be used to provide damping at one engine speed and a second damping network 80 can be used to provide damping at a second engine speed.

As noted above, the amount of damping provided by damping network 80 can also be tuned by changing the amount of damping material 90 present within damping network 80. For example, damping network 80 shown in FIG. 2 has a network volume defined by the combined volumes of first cavity 82, second cavity 84 and flow passages 86 and 88. In some embodiments, between 10% and 50% of the network volume of damping network 80 is occupied by damping material 90. In one particular embodiment, about 50% of the network volume of damping network 80 is occupied by damping material 90. The amount of damping material present in damping network 80 can be adjusted during manufacture to provide airfoils with the same shape but differing damping capabilities. This allows additional manufacturing flexibility. For example, if a compressor design change requires the compressor to operate at a higher or lower temperature that requires a different damping capability, the same airfoil design can be used. More or less damping material 90 can be added to damping network 80 to provide the new damping capabilities required by the design change. This allows the same airfoil design to be used; an entirely new airfoil does not need to be created to account for the design change.

While the above description pertains generally to airfoils in gas turbine engine compressor and low pressure turbine stages, the same concept can be used in other applications at lower temperatures. In applications requiring low temperatures (generally less than about 315° C.), damping material 90 can be in the liquid phase at ambient temperature (about 25° C.). Suitable damping materials 90 for lower temperature applications include hydraulic fluid, oils and other liquids that do not react with the walls that form and define damping network 80.

Airfoil 70 and damping network 80 can be formed using different manufacturing techniques. In some embodiments, additive manufacturing is used to build up airfoil 70 so that it includes the cavities and flow passages of damping network 80. Airfoil 70 is built layer-by-layer using direct metal laser sintering (DMLS), electron beam melting (EBM) or other additive techniques. A three-dimensional model of airfoil 70 with damping network 80 provides detailed build instructions to an additive manufacturing device. Due to the manufacturing capabilities of additive manufacturing, the cavities and flow passages of damping network 80 can have complex and intricate shapes that cannot be made by conventional drilling and machining techniques.

In one embodiment, airfoil 70 is formed using additive manufacturing. Airfoil 70 is formed to contain damping network 80 described above. Damping network 80 communicates with the space outside airfoil 70 by two fill passages that extend through the body of airfoil 70. These fill passages can extend through suction side wall 78, pressure side wall 76 or other components of airfoil 70. Damping material 90 is added to damping network 80 via these fill passages; one fill passage (shown as 98A in FIG. 4) allows damping material 90 to enter damping network 80 and the other fill passage (shown as 98B in FIG. 4) allows air within damping network 80 to escape while damping material 90 is being added. In some cases, damping material 90 must be heated until it liquefies so it can flow easily into damping network 80. Once the desired amount of damping material 90 has been added to damping network 80, the fill passages are sealed with a pin or plug that is welded or brazed to airfoil 70. Typically, the pin or plug is the same material used to construct airfoil 70.

In other embodiments, airfoil 70 is formed using investment casting techniques. Space for damping network 80 is reserved using ceramic cores or refractory metal cores. For example, ceramic cores can be used to form cavities 82 and 84 and refractory metal cores can be used to form flow passages 86, 88 and 92. Alternatively, refractory metal cores can be used to form all of damping network 80. Airfoil 70 is formed around the cores by casting. The cores are then chemically removed from airfoil 70 yielding the cavities and flow passages of damping network 80 and the fill passages needed for adding damping material 90. Damping material 90 is then added to damping network 80 and the fill passages sealed as described above.

Airfoils having the damping network described herein can have extended life when compared to airfoils having physical damping. Physical dampers experience wear and possibly malfunctions that can reduce their effective lifetime. Airfoils having damping network 80 do not experience wear like those with physical dampers, offering the potential for extended life of the part. Damping network 80 also provides additional manufacturing flexibility. Two airfoils with the same shape but different damping capabilities can be produced using the same additive manufacturing or investment casting method. The damping capabilities can be modified by changing the amount of damping material 90 contained within the manufactured airfoil. Manufacturing two airfoils with physical dampers would require two completely different airfoil designs and different manufacturing setups Discussion of Possible Embodiments The following are non-exclusive descriptions of possible embodiments of the present invention.

An airfoil can include an airfoil structure defining a damping network that includes a first cavity, a second cavity, a flow passage connecting the first and second cavities; and a damping material configured to flow through the damping network.

The airfoil of the preceding paragraph can optionally include, additionally and/or alternatively, any one or more of the following features, configurations and/or additional components:

A further embodiment of the foregoing airfoil can include that the airfoil has a leading edge, a trailing edge, a pressure side wall extending from the leading edge to the trailing edge, a suction side wall extending from the leading edge to the trailing edge generally opposite the pressure side wall, where the first cavity is formed between the pressure side wall and the suction side wall and where the second cavity is formed between the pressure side wall and the suction side wall and spaced from the first cavity.

A further embodiment of any of the foregoing airfoils can include that the airfoil is a component of a rotating device where the damping material is configured to flow through the damping network during operation of the rotating device.

A further embodiment of any of the foregoing airfoils can include that the damping network has a network volume where between about 10% and about 50% of the network volume is occupied by the damping material.

A further embodiment of any of the foregoing airfoils can include that the damping network has a network volume where about 50% of the network volume is occupied by the damping material.

A further embodiment of any of the foregoing airfoils can include that the flow passage has a longitudinal axis substantially parallel to an axis of rotation of the rotating device.

A further embodiment of any of the foregoing airfoils can include that the flow passage has a longitudinal axis substantially perpendicular to an axis of rotation of the rotating device.

A further embodiment of any of the foregoing airfoils can include that the flow passage has a longitudinal axis at an angle acute to an axis of rotation of the rotating device.

A further embodiment of any of the foregoing airfoils can include that the damping network also has a second flow passage connecting the first and second cavities.

A further embodiment of any of the foregoing airfoils can include that the damping network also has a third flow passage connecting the flow passage and the second flow passage.

A further embodiment of any of the foregoing airfoils can include that the third flow passage is substantially perpendicular to the flow passage and the second flow passage.

A further embodiment of any of the foregoing airfoils can include that the flow passage is spaced from the pressure side wall by varying distances along a length of the pressure side wall.

A further embodiment of any of the foregoing airfoils can include that the damping material is selected from the group consisting of a bismuth alloy, a tin alloy, oil, hydraulic fluid and combinations thereof.

A method of forming an airfoil can include forming an airfoil body having a damping network that includes a first cavity, a second cavity, and a flow passage connecting the first and second cavities; and adding a damping material configured to flow through the damping network.

The method of the preceding paragraph can optionally include, additionally and/or alternatively, any one or more of the following features, configurations and/or additional components:

A further embodiment of the foregoing method can include that the airfoil body has a leading edge, a trailing edge, a pressure side wall extending from the leading edge to the trailing edge, a suction side wall extending from the leading edge to the trailing edge generally opposite the pressure side wall, where the first cavity is formed between the pressure side wall and the suction side wall and where the second cavity is formed between the pressure side wall and the suction side wall and spaced from the first cavity.

A further embodiment of any of the foregoing methods can include that the step of forming the airfoil body uses additive manufacturing.

A further embodiment of any of the foregoing methods can include that the steps of forming the airfoil body and forming the damping network uses investment casting.

A further embodiment of any of the foregoing methods can include that the step of forming the airfoil body further includes forming at least one fill passage for adding the damping material to the damping network.

A further embodiment of any of the foregoing methods can include that the method further includes sealing the at least one fill passage after the damping material has been added to the damping network.

Although the present invention has been described with reference to preferred embodiments, workers skilled in the art will recognize that changes may be made in form and detail without departing from the spirit and scope of the invention.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
    an airfoil structure defining a damping network that includes a first cavity, a second cavity, and a first flow passage connecting the first and second cavities, a second flow passage connecting the first and second cavities, and a third flow passage connecting the first flow passage and the second flow passage; and
    a damping material configured to flow through the damping network.

2. The airfoil of claim 1, wherein the airfoil comprises a leading edge, a trailing edge, a pressure side wall extending from the leading edge to the trailing edge, a suction side wall extending from the leading edge to the trailing edge generally opposite the pressure side wall, and wherein the first cavity is formed between the pressure side wall and the suction side wall, and wherein the second cavity is formed between the pressure side wall and the suction side wall and spaced from the first cavity.

3. The airfoil of claim 1, wherein the airfoil is a component of a rotating device, wherein the damping material is configured to flow through the damping network during operation of the rotating device.

4. The airfoil of claim 1, wherein the damping network comprises a network volume, and wherein between about 10% and about 50% of the network volume is occupied by the damping material.

5. The airfoil of claim 4, wherein about 50% of the network volume is occupied by the damping material.

6. The airfoil of claim 1, wherein the third flow passage is substantially perpendicular to the first flow passage and the second flow passage.

7. The airfoil of claim 1, wherein the damping material is selected from the group consisting of a bismuth alloy, a tin alloy, oil, hydraulic fluid and combinations thereof.

8. A method of forming an airfoil, the method comprising:
    forming an airfoil body having a damping network that includes a first cavity, a second cavity, and a flow passage connecting the first and second cavities, and forming at least one fill passage for adding the damping material to the damping network; and
    adding a damping material configured to flow through the damping network.

9. The method of claim 8, wherein the airfoil body comprises a leading edge, a trailing edge, a pressure side wall extending from the leading edge to the trailing edge, a suction side wall extending from the leading edge to the trailing edge generally opposite the pressure side wall, and wherein the first cavity is formed between the pressure side wall and the suction side wall, and wherein the second cavity is formed between the pressure side wall and the suction side wall and spaced from the first cavity.

10. The method of claim 8, wherein the step of forming the airfoil body comprises using additive manufacturing.

11. The method of claim 8, wherein the steps of forming the airfoil body and forming the damping network comprise investment casting.

12. The method of claim 8, wherein the method further comprises sealing the at least one fill passage after the damping material has been added to the damping network.

* * * * *